Oct. 21, 1941.     R. M. LINDSAY     2,259,756
VALVE STRUCTURE
Filed Oct. 21, 1940
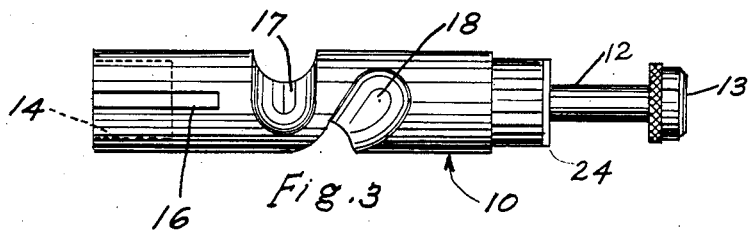
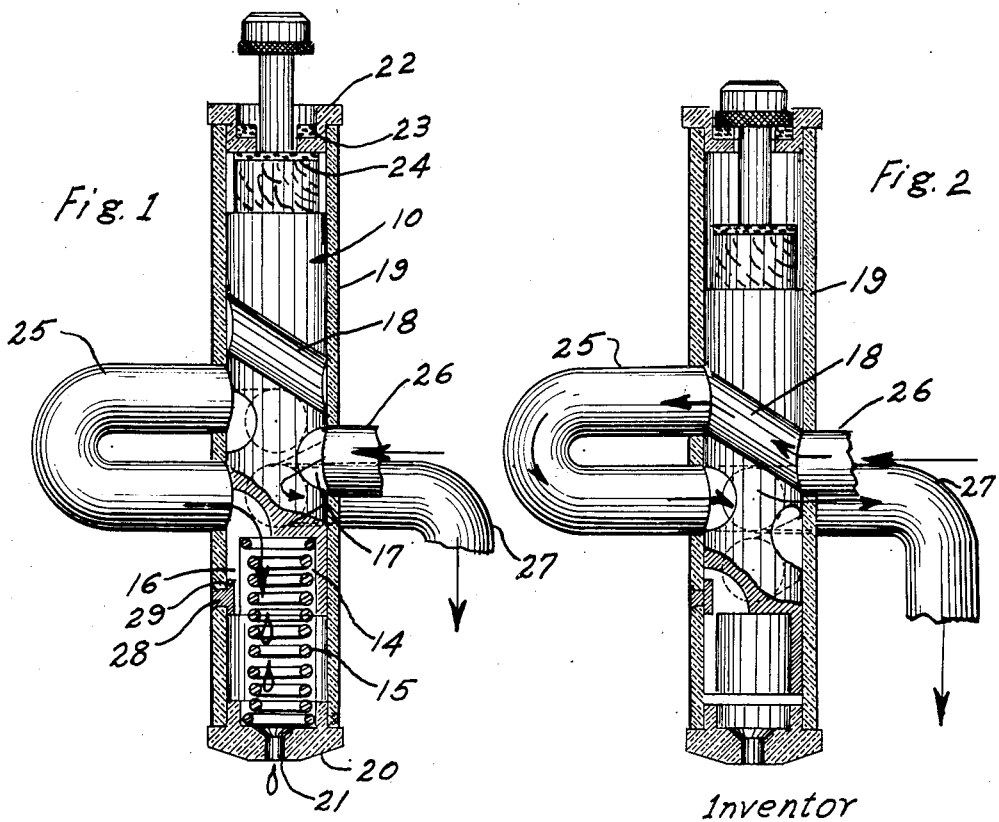
Inventor
Robert M Lindsay
by Dawson Coms & Booth
Attorneys Patented Oct. 21, 1941

2,259,756

UNITED STATES PATENT OFFICE 2,259,756

VALVE STRUCTURE

Robert M. Lindsay, Oak Park, Ill., assignor to Lindsay Engineering & Mfg. Corp., Chicago, Ill., a corporation of Illinois Application October 21, 1940, Serial No. 362,046

6 Claims. (Cl. 84—388)

This invention relates to a valve structure for musical instruments such as, for example, a cornet, etc.

An object of the invention is to provide a valve structure in which the valve body slides longitudinally of the tube, the apertures in the valve body being brought into alignment with various by-pass and other tubes, and means being provided for automatically draining the by-pass tubes. A further object is to provide in a valve structure a valve body which is substantially solid except for passages formed therein, such a structure being free from vibration and resonance and producing clearer and purer tones. Another object is to provide an extremely simple method by means of which air passages can be formed accurately and in a minimum of time within a valve body while avoiding sealing or soldering steps, the insertion of tubes and other expensive and difficult operations.

The invention is illustrated, in a preferred embodiment, by the accompanying drawing, in which—

Figure 1 is a longitudinal sectional view of a valve embodying my invention, the valve body being shown in raised position; Fig. 2, a view similar to Fig. 1, but showing the spring removed; and Fig. 3, a plan view of the valve body removed from the valve casing.

In the illustration given, 10 designates a valve body which is preferably of a form of a solid cylindrical bar. The body is adapted at its upper end to receive the threaded end of the stem 12 which carries the valve cap 13.

The body is provided at its lower end with a recess 14, adapted to receive the upper portion of the spring 15. A drain slot 16 extends through the wall of the valve body around the opening 14 and for a distance above the opening 14. This slot serves the purpose of preventing rotation of the valve and also for draining liquid from the by-pass as will be later described.

The passages 17 and 18 within the valve body are formed by bringing the valve body successively into engagement with a milling wheel, the edge of the wheel being rotated at the desired angle against the valve body until the passages are formed therein. The milling wheel not only forms the passage of the desired depth, but also the wheel is of such diameter as to form a curved inner surface which conforms with the curvature desired for the passage to make it merge smoothly with the port communicating therewith. The passages 17 and 18 are formed successfully and accurately thus by an extremely simple operation, the valve body being advanced in successive steps and slightly rotated each time so as to form the passages at the desired angle. It will be noted that the passage 17 is substantially transverse of the valve, while the passage 18 extends at an inclination through the valve. Both passages are open along their sides. The passage-forming operation can be accurately accomplished in an extremely brief time.

When the valve body above described is placed within the casing or well 19, the passages in the valve body which are open along their sides, are closed by the casing or sleeve, leaving only the ends of the passages open for communication with the aligned tubes.

The valve casing or sleeve 19 is provided at its bottom with a cap 20 having a drain opening 21 therein, the cap being provided with a recess for receiving the spring 15. At its upper end, the casing is equipped with a cap 22, which is recessed to receive a resilient buffer pad 23. A similar buffer pad 24 is carried over the valve body for its usual functions. The valve casing 19 is provided with the usual by-pass 25, with an air inlet tube 26, an air outlet tube 27. Such tubes are shown herein merely for the purpose of illustration, it being understood that other tube connections may be used.

Just below the by-pass valve 25 is a rivet member 28 which extends through the casing wall 19 and provides a key 29, the key engaging the slot 16 of the valve body 10.

In actual operation, when the valves are assembled upon a cornet, etc., the valve structures, say three in number, are supported at a distance about one inch between the centers of the sleeves or casings, close spacing being necessary to permit the valves to be manipulated by the fingers in an up and down movement.

When the valve body 10 is not pressed down the force of the spring 15 urges it to the position shown in Fig. 1. Here the inclined passage 18 serves no function and the transverse passage 17 connects the inlet 26 directly with the outlet 27. When, however, the valve body is depressed as shown in Fig. 2, the inclined passage 18 connects the inlet passage 26 with the by-pass 25, thus increasing the distance of flow of the air, namely through the inclined passage 18, by-pass 25 and back through passage 17 to the outlet passage 27.

The passages 17 and 18, which are open laterally, permit moisture to pass and collect upon the inner walls of the casing 19, the moisture being cut off and collected within the by-pass 25 as the valve body reciprocates. When the valve body is released and allowed to extend upwardly in the position shown in Fig. 1, the drain slot 16 is brought into communication with the lower end of the by-pass 25 and thus a drain takes place through the passage into the inner recess 14 and thence downwardly and out of the opening 21. It will be understood that in forming the curves in the valve body, passages of different shapes may be produced by changing the shape of the milling device. Thus, the passage may have a cross-sectional shape which is substantially rectangular or any other shape. Since the diameter of the valve body is limited because of the one inch spacing required for an instrument of this sort, the passages cannot be placed opposite each other within a valve body because this would result in cutting the valve in two.

The substantial solid body of the valve produces sharp and accurately defined passages which do not permit leaks into the interior of the body, but do allow the escape of moisture upon the inner walls of the casing and the outer walls of the valve body so that the moisture can be collected within the by-pass ports during the reciprocation of the valve body. Should it be desired to modify the valve action slightly on some subsequent part, the passages can be readily remilled, since they are exposed by the lateral opening.

The valve body may be formed of any suitable material. From the standpoint of lightness a body of aluminum, magnesium, or alloys of either may be desirable. Thus, a valve body substantially as light as hollow valve bodies heretofore used and, if desired, of lighter weight, may be produced while at the same time avoiding the insertion of tubes, sealing or soldering thereof. It will be understood, however, that brass or any other suitable metal or any suitable non-metallic composition material may be used.

In the operation of the valve, the moisture passing through the by-pass and collecting therein through engagement with the walls of the sleeve and valve body, is constantly and automatically eliminated through the drain passage 17 which, at the same time, cooperates with the key 29 for locking the valve body against rotary motion.

While in the foregoing description, I have set forth certain details in structure and in steps of operation, it will be understood that such details are given for the purpose of illustration and may be varied widely by those skilled in the art without departing from the spirit of the invention.

I claim:

1. In a valve structure provided with a casing, a valve body within said casing adapted to slide longitudinally thereof, a spring urging said body in one direction, a cap member for moving the valve body longitudinally of the casing, said valve body comprising a substantially solid portion with a central transverse recess open laterally throughout its length and an angularly related recess on one side of said transverse recess and open laterally throughout its length, said recesses forming with said casing air passages.

2. A valve structure comprising a valve casing, a slide valve body within said casing and provided with at least one recess extending diagonally therefrom, said recess being open laterally throughout its length, and spring means within said casing for urging said valve body longitudinally of the casing and in one direction said recess forming with said casing an air passage.

3. A valve structure comprising a casing and a valve body mounted therein for sliding movement, said body having a solid portion formed of light material and having a plurality of recesses extending through said solid body portion, at least one of said recesses being diagonal, and all of said recesses being open laterally throughout their length, said recesses forming with said casing air passages.

4. In a valve structure, a casing provided with a key extending inwardly thereof, a valve body within said casing and mounted for sliding movement therein, a by-pass carried by said valve casing, said valve body being provided with a drain slot extending longitudinally of said body from the lower end thereof and adapted to communicate with said by-pass when said valve has moved in one direction, said body having recesses communicating with said by-pass and forming with said casing air passages, and said slot also receiving said key to prevent rotation of said valve body.

5. A valve structure comprising a valve casing provided with a by-pass tube and other tubes, a valve body slidingly mounted in said casing and provided with recesses adapted to be brought into communication with said tubes, said recesses being open laterally throughout their length, a key carried by said casing and extending into the interior thereof, said valve body being provided with a slot receiving the said key and establishing communication between said by-pass and the lower portion of said casing when said valve body is one of its positions.

6. A valve structure of the character set forth comprising a valve casing having an opening in the bottom thereof, a by-pass tube carried by said casing, a valve plug within said casing and mounted for sliding movement therein, said valve plug having recesses, open laterally throughout their length, being adapted upon sliding movement within said casing to be brought into communication with said by-pass, and a key member carried by said casing below said by-pass, said valve body having its lower end portion provided with a longitudinally extending drain slot receiving said key and, when in upper position, providing a drain between said by-pass and the bottom of said casing.

ROBERT M. LINDSAY.